US011983294B2

(12) United States Patent

Kadoch et al.

(10) Patent No.: US 11,983,294 B2

(45) Date of Patent: May 14, 2024

(54) SYSTEMS AND METHODS FOR TRAFFIC MONITORING WITH IMPROVED PRIVACY PROTECTIONS

(71) Applicant: Rekor Systems, Inc., Columbia, MD (US)

(72) Inventors: Christopher Allen Kadoch, Leesburg, VA (US); Jason Skipper, Sanford, FL (US); Matthew Anthony Hill, Sanford, NC (US)

(73) Assignee: Rekor Systems, Inc., Columbia, MD (US)

( * ) Notice: Subject to any disclaimer, the term of this patent is extended or adjusted under 35 U.S.C. 154(b) by 294 days.

(21) Appl. No.: 17/489,913

(22) Filed: Sep. 30, 2021

(65) Prior Publication Data

US 2022/0100894 A1 Mar. 31, 2022

Related U.S. Application Data

(60) Provisional application No. 63/085,805, filed on Sep. 30, 2020.

(51) Int. Cl.

*G06F 21/62* (2013.01)
*G08G 1/01* (2006.01)
*G08G 1/017* (2006.01)

(52) U.S. Cl.

CPC ....... *G06F 21/6245* (2013.01); *G08G 1/0141* (2013.01); *G08G 1/0175* (2013.01)

(58) Field of Classification Search

CPC ............. G06F 21/6245; G08G 1/0141; G08G 1/0175; G08G 1/0116; G08G 1/0133

See application file for complete search history.

(56) References Cited

U.S. PATENT DOCUMENTS

2004/0252193 A1* 12/2004 Higgins ................. G08G 1/054 348/149

FOREIGN PATENT DOCUMENTS

| | | | |
|---|---|---|---|
| FR | 2 847 755 | A1 | 5/2004 |
| KR | 10-1513215 | B1 | 4/2015 |
| WO | WO 2004/042673 | A2 | 5/2004 |

OTHER PUBLICATIONS

PCT/US21/71658, International Search Report (PCT/ISA/220 and PCT/ISA/210) dated Dec. 30, 2021, enclosing Written Opinion of the International Searching Authority (PCT/ISA/237) (Seven (7) pages).

* cited by examiner

*Primary Examiner* — Beemnet W Dada

(74) *Attorney, Agent, or Firm* — Crowell & Moring LLP

(57) ABSTRACT

A traffic sensor includes an imaging unit that generates a recognition record by image recognition processing a captured image of a vehicle. The recognition record includes personal-identification data useable to identify the vehicle owner, and additional data not useable to identify the vehicle owner. The traffic sensor also includes an obfuscation unit that generates an obfuscated record from the recognition record by converting the personal-identification data into a unique-identifier. The obfuscated record includes the unique-identifier and the additional data. The traffic sensor further includes a transceiver configured to transmit the obfuscated record to a first off-site server without transmitting the recognition record to the first off-site server.

18 Claims, 2 Drawing Sheets

SYSTEMS AND METHODS FOR TRAFFIC MONITORING WITH IMPROVED PRIVACY PROTECTIONS

CROSS-REFERENCE TO RELATED APPLICATIONS

This application claims the benefit of U.S. Provisional Application No. 63/085,805, filed Sep. 30, 2020, the disclosures of which are expressly incorporated by reference herein.

BACKGROUND

The present invention relates to traffic monitoring systems and methods, and more particularly to such systems and methods for deriving traffic and roadway information while protecting personally identifiable information.

Roadway traffic is generally monitored for traffic characteristics, such as vehicle count, congestion, average speed, etc. This data is then used by civilian services, e.g., the Department of Transportation, to develop and implement policy. Traditional roadway traffic monitor systems consist of multiple sensors types having disparate implementation schemes. For example, pressure sensor based road surface counters have been used to identify the number of vehicles passing over sections of road. Radar based systems have been used for monitoring vehicle speed, as well as for vehicle counting.

It is therefore desirable to consolidate the disparate sensor systems into a traffic monitoring system that utilizes a single sensor type to provide the traffic characteristic data of these disparate systems. Imaging device based traffic monitoring provides a potential solution.

Imaging device based automated license plate readers have been used by law enforcement to monitor roadways for vehicles of interest to law enforcement—e.g., vehicles owned by persons suspected of committing crimes. Imaging devices capture images of license plates, and image recognition software produces a read-record that identifies the license plate number and may also include vehicle characteristics for comparison to a list of suspect vehicles.

However, the application of such imaging device based systems to traffic monitoring for civilian use raises personal privacy concerns. This is because the read-records inherently provide personally identifiable information in the form of at least the recognized license plate number, which can be—and is—used to identify the vehicle owner.

A consolidated traffic monitoring system that provides imaging device based traffic monitoring for civilian, commercial and/or law enforcement use, while protecting personally identifiable information, is needed.

BRIEF SUMMARY OF THE INVENTION

Systems and methods are disclosed that utilizes a single sensor type to consolidate traffic monitoring for civilian, commercial and/or law enforcement use, while protecting personally identifiable information. In at least one embodiment, a traffic sensor includes an imaging unit that generates a recognition record by image recognition processing a captured image of a vehicle. The recognition record includes personal-identification data useable to identify the vehicle owner, and additional data not useable to identify the vehicle owner. The traffic sensor also includes an obfuscation unit configured to generate an obfuscated record from the recognition record by converting the personal-identification data into a unique-identifier. The obfuscated record includes the unique-identifier and the additional data. The traffic sensor further includes a transceiver that transmits the obfuscated record to a first off-site server without transmitting the recognition record to the first off-site server. The traffic sensor can accordingly provide a single sensor type that provides data appropriate for civilian, commercial and/or law enforcement use, while protecting personally identifiable information.

Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples.

BRIEF DESCRIPTION OF THE DRAWINGS

The features, objects, and advantages of the present invention will become more apparent from the detailed description, set forth below, when taken in conjunction with the drawings, in which like reference characters identify elements correspondingly throughout.

DETAILED DESCRIPTION OF THE PREFERRED EMBODIMENTS

Figure 1:
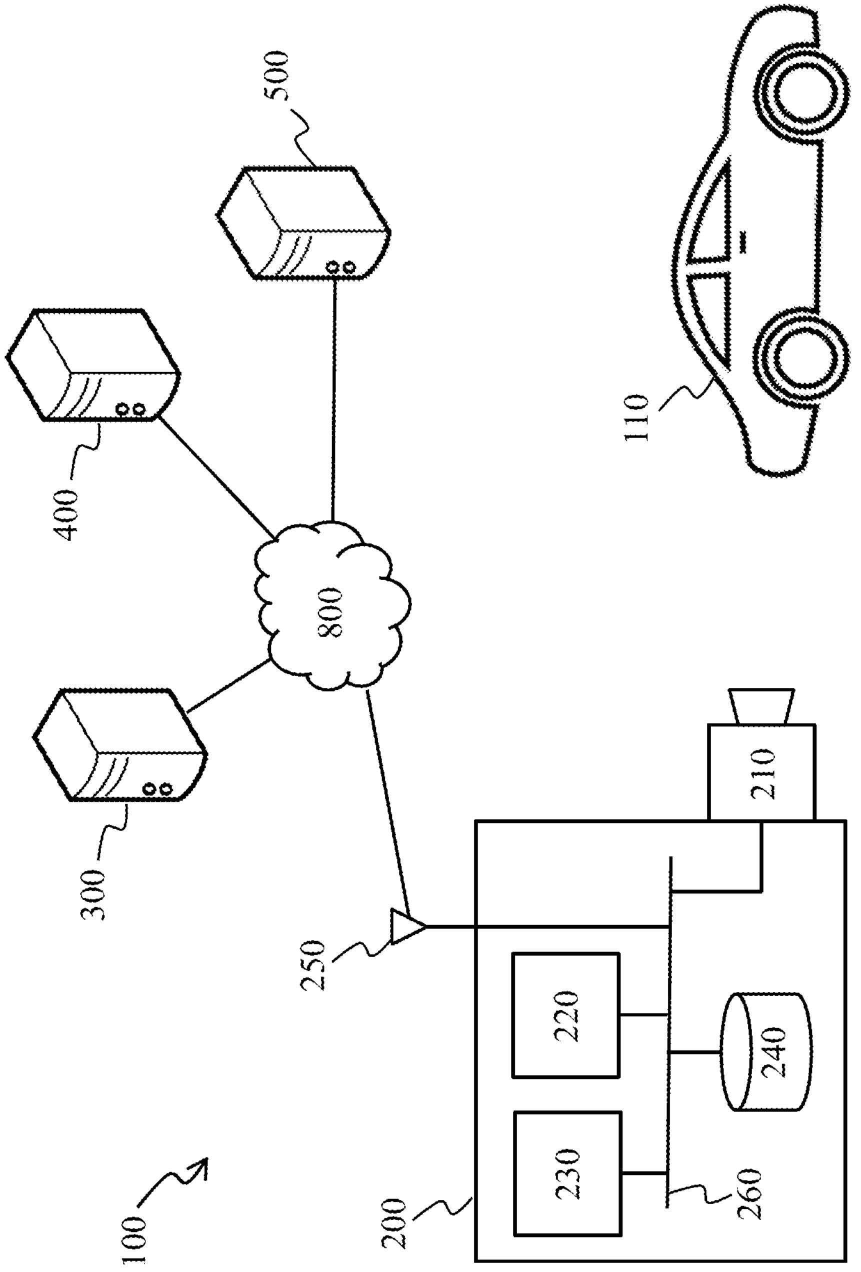
FIG. 1 illustrates an exemplary traffic monitoring system in accordance with at least one embodiment of the invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

The present invention generally relates to traffic monitoring systems and methods, and more particularly to such systems and methods performed whilst protecting personally identifiable information during traffic monitoring.

FIG. 1 is a schematic representation of a traffic monitoring system 100 in accordance with one or more aspects of the invention. As shown in FIG. 1, the traffic monitoring system 100 comprises one or more traffic sensors 200 communicatively coupled to a system server 300, via a network 800. In general, the traffic monitoring system 100 enables the collection of traffic related data for transmission to a law-enforcement server 400 and/or a civilian service server 500 and/or a department of traffic (or other road/traffic monitoring entities) server 600 and/or other commercial data servers 700, via the network 800.

Each traffic sensor 200 comprises an imaging device 210, an image processing unit 220, an obfuscation unit 230, a memory 240, and a transceiver 250, each communicatively coupled to a common data bus 260 that enables data communication between the respective components. It will be understood that one or more components of the traffic sensors 200, or functions thereof, may be distributed through the traffic monitoring system 100.

The imaging device 210 captures images of traffic, in particular, video images of vehicles 110 making up the traffic, and generates video data therefrom. The imaging device 210 may be a video camera of any camera type, which captures video images suitable for computerized image recognition of objects within the captured images. For example, the camera may utilize charge-coupled-device (CCD), complementary metal-oxide-semiconductor (CMOS) and/or other imaging technology, to capture standard, night-vision, infrared, and/or other types of images, having predetermined resolution, contrast, color depth, and/or other image characteristics. The video data may be timestamped so as to indicate the date and time of recording.

The image processing unit 220 applies computerized image recognition techniques to the video data captured by the imaging device 210 so as to identify objects within the video images. In particular, the image processing unit 220 identifies individual vehicles captured by the video images, as well as their associated characteristics. These vehicle characteristics may include, for example, vehicle type, class, make, model, color, year, drive type (e.g., electric, hybrid, etc.), license plate number, registration, trajectory, speed, location, etc., or any combination thereof.

The image processing unit 220 generates a recognition record (i.e., a read-record) for each recognized vehicle from the recognized vehicle characteristics. The recognition record is preferably a dataset of image recognized values for one or more of the vehicle characteristics, i.e., characteristic data. For example, the characteristic data for the license plate number characteristic is the image recognized license plate number for the recognized vehicle. In at least one embodiment, the recognition record is at least the license plate number.

The recognition record may include both personal-identification (PI) data and non-PI data. PI data is characteristic data that can be used to personally identify the vehicle owner, e.g., license plate number, whereas non-PI data is characteristic data that cannot be used to personally identify the vehicle owner, e.g., vehicle make, model, trajectory and speed. The recognition record may also include the timestamp of the associated video data, such that it may be correlated therewith. The recognition record is also preferably in the form of a data object whose value is the license plate number, and whose metadata reflects the remainder of the characteristic values, if any.

The image processing unit 220 may also apply image analysis techniques to the image-recognized video images so as to identify captured traffic characteristics. These traffic characteristics may include, for example, temporal histories, vehicle counts, congestion levels, the presence of accidents, disabled vehicles, foreign objects, or other traffic incidents, or any combination thereof. Corresponding traffic data, i.e., identified values for the traffic characteristics, may also be included in the recognition record, preferably as metadata.

The image obfuscation unit 230 obfuscates the recognition record for each recognized vehicle, so as to generate an obfuscated recognition record. In particular, the image obfuscation unit 230 applies an obfuscation function to the PI data so as to irreversibly convert the PI data into a unique identifier. The obfuscation function may be, for example, a hash function or other one-way cryptographic function, that generates the unique identifier from the PI data. The unique identifier may, in turn, be a multi-character, alpha-numeric vehicle fingerprint, so to speak, that is associated with the non-PI data (and traffic data). The unique-identifier is preferably unique to the vehicle. For example, if the vehicle is separately detected in at a different date/time/location, the same unique-identifier can be applied. This permits a recurrence relationship to be established with respect to patterns of movement without the PI data being disclosed.

The obfuscated recognition record is therefore preferably the recognition record, or portion thereof, except with the unique identifier in place of the PI data. In at least one embodiment, the obfuscated recognition record is in the form of a data object whose value is the unique identifier, and whose metadata reflects the remainder of the characteristic values. The obfuscation recognition record is preferably at least the unique identifier.

The image processing unit 220 and the image obfuscation unit 230 may be embodied, collectively or individually, as one or more processors programmed to carry out the functions of each unit in accordance software stored in the memory 240. Each processor may be a standard processor, such as a central processing unit (CPU), graphics processing unit (GPU), or a dedicated processor, such as an application-specific integrated circuit (ASIC) or field programmable gate array (FPGA), or portion thereof. It will be understood that one or both units may be alternatively embodied as part of the system server 300.

The memory 240 stores software and data that can be accessed by the processor(s), and includes both transient and persistent storage. The transient storage is configured to temporarily store data being processed or otherwise acted on by other components, and may include a data cache, RAM or other transient storage types. The persistent storage is configured to store software and data until actively deleted.

In at least some embodiments, the memory 240 is configured to store the recognition records, the obfuscated recognition records, and the associated video data, in accordance with one or more retention periods, after which the data is deleted. The retention periods may be set individually or with respect to categories of data. For example, the retention period for video data may be 30 days, whereas the retention period for recognition records may be 2 hours. The retention period for obfuscation recognition records is preferably longer than the retention period for recognition records.

The transceiver 250 communicatively couples the traffic sensor 200 to the network 800 so as to enable data transmission therewith. The network 800 may be any type of network, wired or wireless, configured to facilitate the communication and transmission of data, instructions, etc., and may include a local area network (LAN) (e.g., Ethernet or other IEEE 802.03 LAN technologies), Wi-Fi (e.g., IEEE 802.11 standards, wide area network (WAN), virtual private network (VPN), global area network (GAN)), a cellular network, or any other type of network or combination thereof.

In general, each server many include one or more server computers connected to the network 800. Each server computer may include computer components, including one or more processors, memories, displays and interfaces, and may also include software instructions and data for executing the functions of the server described herein. The servers may also include one or more storage devices configured to store large quantities of data and/or information, and may further include one or more databases. For example, the storage device may be a collection of storage components, or a mixed collection of storage components, such as ROM, RAM, hard-drives, solid-state drives, removable drives, network storage, virtual memory, cache, registers, etc., configured so that the server computers may access it.

The system server 300 is generally configured to provide centralized support for the traffic sensors 200. The system server 300 is configured to receive obfuscated recognition records from each of the traffic sensors 200, and to store the received obfuscated recognition records in one or more databases (not shown). The system server 300 may request the obfuscated recognition records from each traffic sensor, individually or collectively, in accordance with a set schedule and/or on an ad hoc basis.

In at least one embodiment, the system server 300 comprises an analysis engine (not shown), which is configured to analyze historical obfuscated recognition records stored in the database to generate PI data agnostic traffic metrics for various periods of time. The traffic metrics may be generated via statistical analysis of the historical obfuscated recognition records, or by comparison of the historical obfuscated recognition records with secondary data sets (e.g., manufacturer identified weight, emissions, etc. of make/model), or any combination thereof. The traffic metrics may be, for example, vehicle tonnage, emissions, drive types, number, etc., over a section of the roadway per period of time.

In addition, the system server 300 may associate obfuscated recognition records having common unique identifiers. For example, the characteristic data associated with a particular unique identifier may be analyzed to determine whether that vehicle is a commuter or a visitor to the area—and the system server 300 may filter out visitors' obfuscated recognition records in generating the traffic metrics. The system server 300 may thus provide more nuanced and accurate traffic metrics.

The system server 300 may store the traffic metrics in the database for later retrieval, update, modification, deletion, etc. In at least one embodiment, the system server 300 transmits the traffic metrics, via the network 800, to the civilian service server 500. The system server 300 may, additionally or alternatively, transmit the obfuscated recognition records to the civilian service server 500.

The civilian service server 500 is a server of a civilian service, e.g., department of transportation, municipality, etc., whether public (e.g., department of transportation, municipality, etc.,) or private (e.g., trucking company, security, etc.). In general, the civilian service may utilize the traffic metrics for providing various services, such as, for example, determining the placement of electric charging stations, zoning, routing fleet vehicles, or any other service or objective that traffic related data may be used for.

The system server 300 is also configured to receive recognition records from each of the traffic sensors 200, and to transmit the received recognition records to the law-enforcement server 400. The law-enforcement server 400 is a server of a law-enforcement agency, e.g., police, highway patrol, sheriff, or other local, state or federal law-enforcement agency. In at least one embodiment, the system server 300 is configured to store the recognition records only so long as is necessary for the secure transmittal of the recognition records to the law-enforcement server 400. Additionally, or alternatively, the traffic sensors 200 may be configured to directly transmit the recognition records directly to the law-enforcement server 400. In at least one embodiment, the system server 300 and/or the traffic sensors 200 transmit only part of the recognition record, namely the license plate number.

Figure 2:
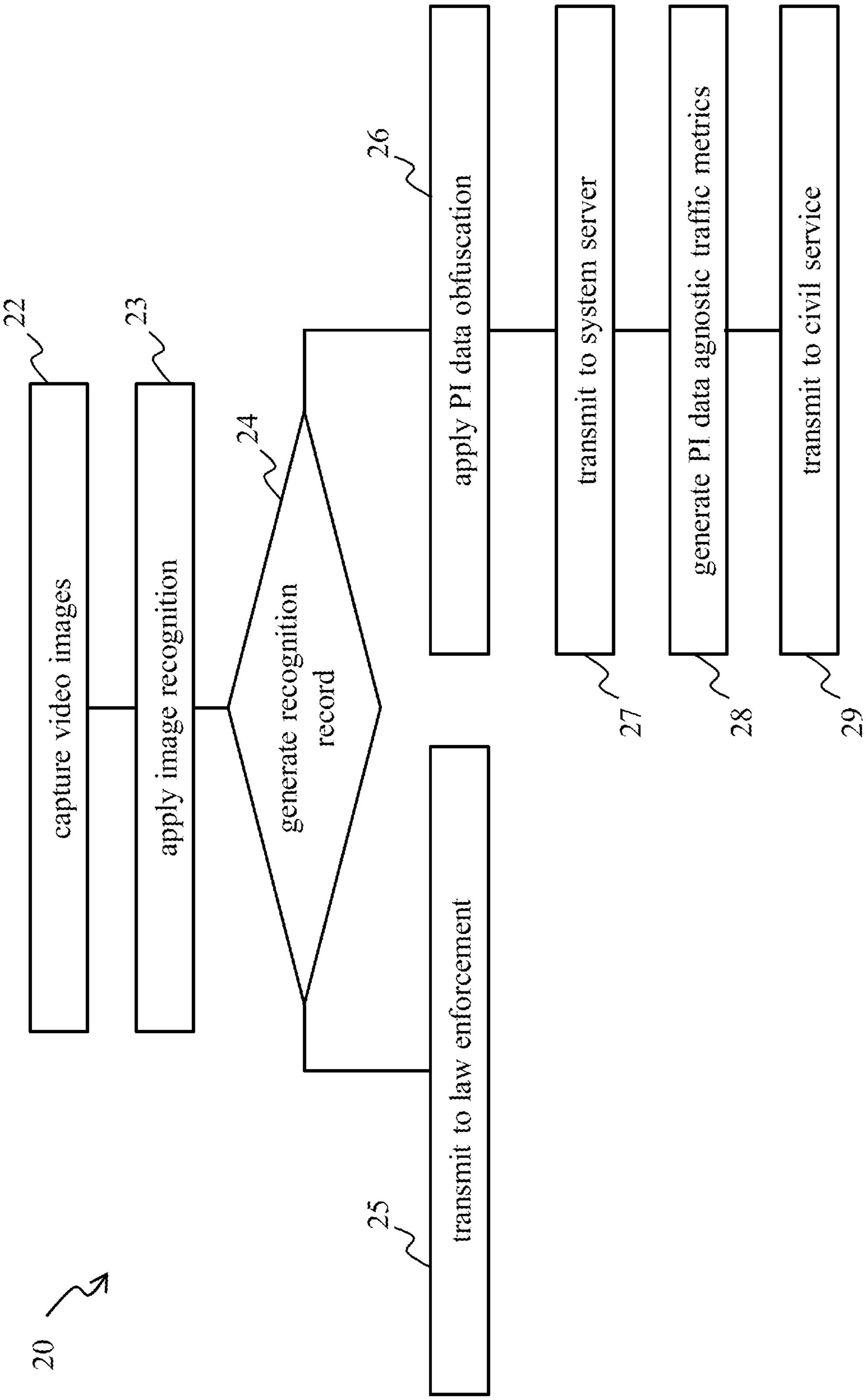
FIG. 2 illustrates an exemplary method for traffic monitoring in accordance with at least one embodiment of the invention.

FIG. 2 is a flow-chart representing an exemplary method 20 of operation for the traffic monitoring system in accordance with one or more aspects of the invention.

In operation, at step 22, respective imaging devices 210 of a plurality of traffic sensors 200 capture images of vehicle traffic, namely, video images of passing vehicles, and generate video data therefrom. The traffic sensors 200 are preferably each positioned at various roadway locations where the vehicle traffic is to be monitored. The imaging devices 210 are preferably positioned such that the captured images include the respective license plates of the passing vehicles, as well as other vehicle characteristics, e.g., vehicle type, class, make, model, color, year, drive type, license plate number, registration, trajectory, speed, location, etc., or any combination thereof.

At step 23, the image processing unit 220 applies computerized image recognition techniques to the video data captured by the imaging device 210 so as to identify objects within the video images. The image processing unit 220 thereby identifies the presence of individual vehicles, as well as their license plates and one or more of their vehicle characteristics. The image processing unit 220 may utilize any image recognition software suitable for this purpose.

At step 24, the image processing unit 220 generates a recognition record for each recognized vehicle from the recognized vehicle characteristics. The recognition record is preferably a dataset of image recognized values for each of the vehicle characteristics, i.e., characteristic data. For example, the characteristic data for the license plate number characteristic is the image recognized license plate number for the recognized vehicle. In at least one embodiment, the recognition record is in the form of a data object whose value is the license plate number, and whose metadata reflects the remainder of the characteristic values.

The recognition record preferably includes both personally identifiable (PI) data and non-PI data. PI data is characteristic data that can be used to personally identify the vehicle owner, e.g., license plate number, whereas non-PI data is characteristic data that cannot be used to personally identify the vehicle owner, e.g., vehicle make, model, trajectory and speed. The recognition record may also include the timestamp of the associated video data, such that it may be correlated therewith.

At step 25, the recognition records are transmitted, via the network 800, to the law-enforcement server 400. The recognition records may be transmitted directly from the traffic sensor 200 and/or indirectly, via the system server 300. In some embodiments, the system server 300 and/or the traffic sensors 200 may transmit only part of the recognition record, namely the license plate number, to the law-enforcement server 400.

At step 26, the image obfuscation unit 230 obfuscates the recognition record for each recognized vehicle, so as to generate an obfuscated recognition record. The obfuscation function may be, for example, a hash function or other one-way cryptographic function, that generates the unique identifier from the PI data. The unique identifier may, in turn, be a multi-character, alpha-numeric vehicle fingerprint, so to speak, that is associated with the non-PI data (and traffic data). The obfuscated recognition record is therefore preferably the recognition record, except with the unique identifier in place of the PI data. In at least one embodiment, the obfuscated recognition record is in the form of a data object whose value is the unique identifier, and whose metadata reflects the remainder of the characteristic values.

At step 27, the obfuscated recognition records are transmitted to the system server 300, where they are stored and analyzed to generate PI data agnostic traffic metrics for various periods of time (step 28). The traffic metrics may be generated via statistical analysis of the historical obfuscated recognition records, or by comparison of the historical obfuscated recognition records with secondary data sets (e.g., manufacturer identified weight, emissions, etc. of make/model), or any combination thereof. The traffic metrics may be, for example, vehicle tonnage, emissions, drive types, number, etc., over a section of the roadway per period of time.

At step 29, the system server 300 transmits the traffic metrics, via the network 800, to the civilian service server 500, which may utilize the traffic metrics for providing various services, such as, for example, determining the placement of electric charging stations, zoning, routing fleet vehicles, or any other service or objective that traffic related data may be used for.

In this manner, the traffic monitoring system 100 captures and reports traffic related information for both law-enforcement and civilian uses, while also protecting PI data in consideration of personal privacy concerns.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A traffic sensor, comprising:

an imaging unit configured to generate a recognition record by image recognition processing a captured image of a vehicle, wherein the recognition record includes:

personal-identification data useable to identify the vehicle owner, and additional data not useable to identify the vehicle owner, an obfuscation unit configured to generate an obfuscated record from the recognition record by converting the personal-identification data exclusive of the additional data into a unique-identifier, wherein the obfuscated record includes the unique-identifier and the additional data; and a transceiver configured to transmit the obfuscated record to a first off-site server without transmitting the recognition record to the first off-site server.

2. The traffic sensor of claim 1, wherein the personal-identification data is irreversibly converted into the unique-identifier.

3. The traffic sensor of claim 1, wherein a cryptographic function is used to convert the personal-identification data into the unique-identifier.

4. The traffic sensor of claim 3, wherein the cryptographic function is a hash function.

5. The traffic sensor of claim 1, wherein the personal-identification data includes at least: license plate number.

6. The traffic sensor of claim 1, wherein the additional data includes at least: vehicle type, class, make, model, color, year, drive type hybrid, registration, trajectory, speed, and location.

7. The traffic sensor of claim 1, wherein the imaging unit is further configured to:

analyze the captured image to generate traffic characteristic data identifying traffic characteristics, wherein the recognition record further includes the traffic characteristic data.

8. The traffic sensor of claim 1, wherein the transceiver is further configured to:

transmit the recognition record to a second off-site server without transmitting the obfuscated record to the second off-site server.

9. The traffic sensor of claim 8, wherein the first off-site server is a civilian authority server and the second off-site server is a law-enforcement server.

10. A traffic monitoring method, comprising:

generating a recognition record, at a traffic sensor, by image recognition processing a captured image of a vehicle, wherein the recognition record includes:

personal-identification data useable to identify the vehicle owner, and additional data not useable to identify the vehicle owner, generating an obfuscated record, at the traffic sensor, from the recognition record by converting the personal-identification data into a unique-identifier, wherein the obfuscated record includes the unique-identifier and the additional data;

transmitting the obfuscated record from the traffic sensor to a first off-site server without transmitting the recognition record to the first off-site server.

11. The traffic monitoring method of claim 10, wherein the personal-identification data is irreversibly converted into the unique-identifier.

12. The traffic monitoring method of claim 10, wherein a cryptographic function is used to convert the personal-identification data into the unique-identifier.

13. The traffic monitoring method of claim 12, wherein the cryptographic function is a hash function.

14. The traffic monitoring method of claim 10, wherein the personal-identification data includes at least: license plate number.

15. The traffic monitoring method of claim 10, wherein the additional data includes at least: vehicle type, class, make, model, color, year, drive type hybrid, registration, trajectory, speed, and location.

16. The traffic monitoring method of claim 10, further comprising:

analyzing the captured image to generate traffic characteristic data identifying traffic characteristics, wherein the recognition record further includes the traffic characteristic data.

17. The traffic monitoring method of claim 10, further comprising:

transmitting the recognition record from the traffic sensor to a second off-site server without transmitting the obfuscated record to the second off-site server.

18. The traffic monitoring method of claim 17, wherein the first off-site server is a civilian authority server and the second off-site server is a law-enforcement server.

* * * * *